United States Patent
Kotrla et al.

(10) Patent No.: US 8,437,262 B2
(45) Date of Patent: May 7, 2013

(54) DISABLED STATE AND STATE SIGNALING FOR LINK AGGREGATION

(75) Inventors: Scott R. Kotrla, Wylie, TX (US); Howard H. Chiu, Plano, TX (US); Donald Pitchforth, Jr., Rockwall, TX (US); Michael U. Bencheck, Richardson, TX (US); Richard C. Schell, Allen, TX (US); Matthew W. Turlington, Richardson, TX (US); Glenn Wellbrock, Wylie, TX (US); James D. Lee, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/174,145

(22) Filed: Jun. 30, 2011

(65) Prior Publication Data

US 2011/0292787 A1  Dec. 1, 2011

Related U.S. Application Data

(63) Continuation of application No. 12/793,747, filed on Jun. 4, 2010, now Pat. No. 8,036,134, which is a continuation of application No. 11/550,094, filed on Oct. 17, 2006, now Pat. No. 7,835,291.

(51) Int. Cl.
*H04L 1/00* (2006.01)

(52) U.S. Cl.
USPC ............................. 370/242; 714/2; 370/225

(58) Field of Classification Search ............ 370/225, 370/242; 714/2, 25
See application file for complete search history.

(56) References Cited

U.S. PATENT DOCUMENTS

| | | | |
|---|---|---|---|
| 4,888,586 A | 12/1989 | Ise et al. | |
| 4,918,623 A * | 4/1990 | Lockitt et al. | 709/224 |
| 6,877,105 B1 | 4/2005 | Watanabe et al. | |
| 7,768,928 B2 | 8/2010 | Harel et al. | |
| 2003/0128706 A1 | 7/2003 | Mark et al. | |
| 2004/0042396 A1 | 3/2004 | Brown et al. | |
| 2004/0085894 A1 | 5/2004 | Wang et al. | |
| 2005/0249123 A1 | 11/2005 | Finn | |
| 2006/0227711 A1 | 10/2006 | Nakagawa et al. | |
| 2007/0201380 A1 | 8/2007 | Ma et al. | |
| 2008/0089235 A1 | 4/2008 | Kotrla et al. | |

FOREIGN PATENT DOCUMENTS

| | | |
|---|---|---|
| CN | 1527547 | 9/2004 |
| DE | 3924763 A1 * | 7/1991 |
| WO | WO-2005/112348 | 11/2005 |
| WO | WO-2006/050317 | 5/2006 |

OTHER PUBLICATIONS

English Translation of Steffens (DE 3924763).*
IEEE Standard 802.3 (2002).
Lan Man Standrs. Committee of the IEEE Comp. Society: "Amndt. to Carrier Sense Multiple Access with Collision Detection (CSMA/CD) Access Method and Physical Layer Specifications-Aggregation of Multiple Link segments", IEEE Stand. 802.3AD-2000, Mar. 30, 2000.

* cited by examiner

*Primary Examiner* — Kibrom T Hailu
*Assistant Examiner* — Benjamin Lamont

(57) ABSTRACT

A device enables a disabled timer state for a link aggregation group (LAG) link if a disabled timer condition is determined for the LAG link, and enables a disabled state for the LAG link if a disabled condition is determined for the LAG link in the disabled timer state.

15 Claims, 10 Drawing Sheets

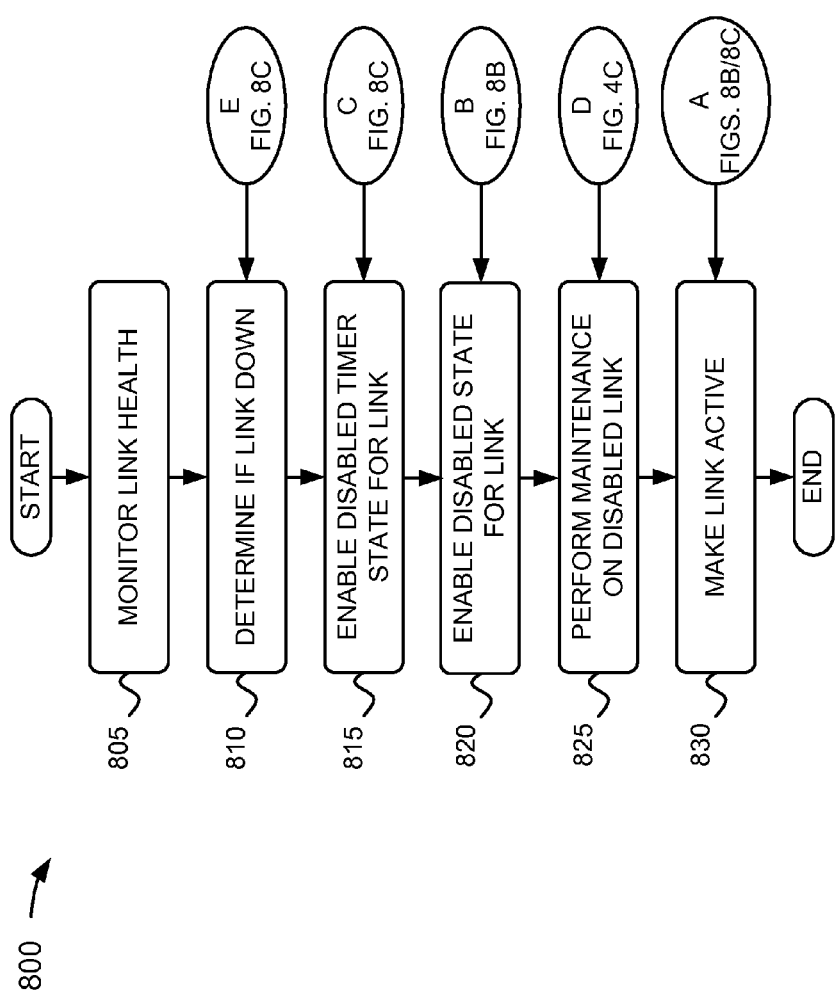

DISABLED STATE AND STATE SIGNALING FOR LINK AGGREGATION

RELATED APPLICATIONS

This application is a continuation of U.S. patent application Ser. No. 12/793,743, filed Jun. 4, 2010, now U.S. Pat. No. 8,036,134 which is a continuation of U.S. patent application Ser. No. 11/550,094, filed Oct. 17, 2006 (now issued as U.S. Pat. No. 7,835,291), the entire disclosure of which are incorporated herein by reference.

BACKGROUND INFORMATION

A link aggregation (e.g., as set forth in IEEE 802.3ad) is a computer networking term which describes using multiple links (e.g., Ethernet network cables and/or ports in parallel) as one logical port to increase the link speed beyond the limits of any one single link. Other terms used for link aggregation may include Ethernet trunking, network interface card (NIC) teaming, port teaming, NIC bonding, and/or link aggregation group (LAG). LAG will be used hereinafter to refer to link aggregation.

LAG is an inexpensive way to set up a high-speed backbone network that may transfer more datagrams than any one single port or device can utilize. A "datagram(s)" may include any type or form of data, such as packet or non-packet data. LAG may permit several devices to communicate simultaneously at their full single-port speed, while not permitting any one single device to monopolize all available backbone capacity. Network datagrams may be dynamically distributed across ports so that administration of what datagrams actually flow across a given port may be taken care of automatically with the LAG.

LAGs also provide reliability. Should one of the multiple ports used in a LAG fail, network traffic (e.g., datagrams) may be dynamically redirected to flow across the remaining good ports in the LAG. The redirection may be triggered when a switch learns that a media access control (MAC) address has been automatically reassigned from one LAG port to another port in the same LAG. The switch may send the datagrams to the new LAG port, and the network may continue to operate with virtually no interruption in service.

A LAG protocol (LAP), such as the LAP set forth in IEEE 802.3ad, allows one or more links to be aggregated together to form a LAG. Once implemented, the LAG can be configured and reconfigured quickly and automatically with a low risk of duplication or rendering of frames.

Typical Ethernet LAG arrangements fail to utilize information beyond a binary up/down state of the member links (e.g., ports) in the LAG. That is, a link is either available for datagram(s) to be transmitted across it (e.g., up), or not available for use under any circumstances (e.g., down). The health of a typical LAG link can not be monitored while the LAG link is actively used. When a typical LAG link comes into service, a timer can be used to determine how long the link has to be up before datagram(s) are transmitted across it. However, during this time period, the link can not be used under any circumstances, even failure of other links in the LAG.

BRIEF DESCRIPTION OF THE DRAWINGS

The accompanying drawings, which are incorporated in and constitute a part of this specification, illustrate an embodiment of the invention and, together with the description, explain the invention. In the drawings:

FIGS. 8A-8C show a flowchart of an exemplary process for a network and/or a network device of FIG. 1 according to implementations consistent with principles of the invention.

DETAILED DESCRIPTION OF PREFERRED EMBODIMENTS

The following detailed description of the invention refers to the accompanying drawings. The same reference numbers in different drawings may identify the same or similar elements. Also, the following detailed description does not limit the invention.

Implementations described herein may provide systems and methods that provide a disabled state, a disabled timer state, and a maintenance state for links of network devices operating within a LAG, without removing the links from the LAG or from service. The systems and methods may protect a LAG in the event that all active LAG links fail, and may monitor the performance of inactive LAG links so that their current health may be available. The systems and methods may also track LAG links that are not currently being used, and may delay use of links that have recently had alarms cleared until the current health of the links can be confirmed. The systems and methods may further integrate a LAG with other forms of Ethernet protection that support a single active link at a time.

Figure 1:
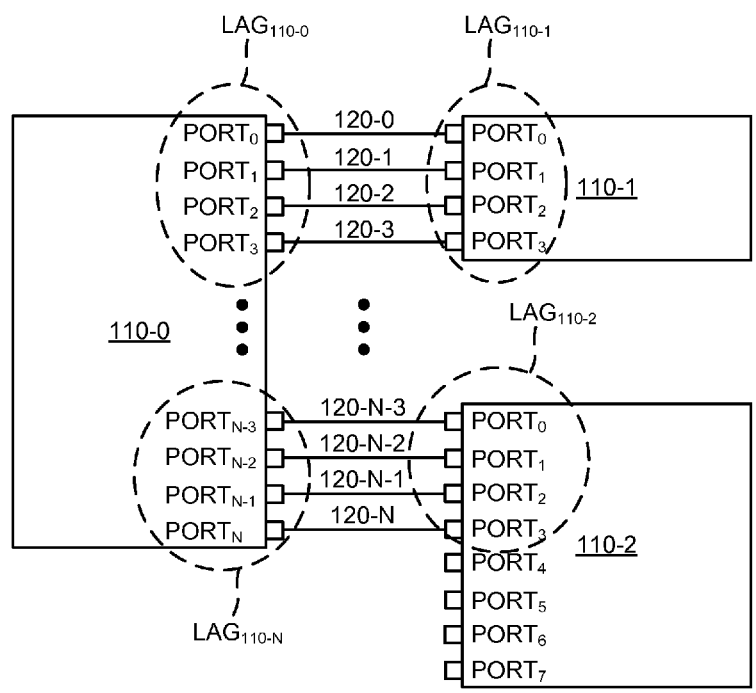
FIG. 1 is a diagram illustrating an exemplary network in which systems and methods consistent with principles of the invention may be implemented.

FIG. 1 is a diagram illustrating an exemplary network 100 in which systems and methods consistent with principles of the invention may be implemented. Network 100 may include, for example, a local area network (LAN), a private network (e.g., a company intranet), a wide area network (WAN), a metropolitan area network (MAN), or another type of network.

As shown in FIG. 1, network 100 may include network devices 110-0, 110-1 and 110-2 (collectively referred to as network devices 110) interconnected by links 120-0, . . . , 120-N (collectively referred to as links 120). While three network devices 110 and eight links 120 are shown in FIG. 1, more or fewer network devices 110 and/or links 120 may be used in other implementations consistent with principles of the invention. Network 100 may also include other components, devices, etc. (not shown in FIG. 1).

Network device 110 may include a variety of network devices. For example, network device 110 may include a computer, a router, a switch, a network interface card (NIC), a hub, a bridge, etc. Links 120 may include a path that permits communication among devices 110, such as wired, wireless, and/or optical connections, input ports, output ports, etc. For example, network device 110-0 may include ports $PORT_0$, $PORT_1, \ldots, PORT_N$, network device 110-1 may include ports $PORT_0$, $PORT_1$, $PORT_2$, $PORT_3$, and network device 110-2 may include ports $PORT_0, PORT_1, \ldots, PORT_7$. The ports of network devices 110 may be considered part of corresponding links 120 and may be either input ports, output ports, or combinations of input and output ports. While eight ports for network device 110-0, four ports for network device 110-1, and eight ports for network device 110-2 are shown in FIG. 1, more or fewer ports may be used in other implementations consistent with principles of the invention.

In an exemplary implementation, network devices 110 may provide entry and/or exit points for datagrams in network 100. Since Ethernet may be bi-directional, the ports (e.g., $PORT_0, \ldots,$ and $PORT_N$) of network device 110-0 may send and/or receive datagrams. The ports (e.g., $PORT_0, PORT_1, PORT_2,$ and $PORT_3$) of network device 110-1 and the ports (e.g., $PORT_0, \ldots,$ and $PORT_7$) of network device 110-2 may likewise send and/or receive datagrams.

A LAG may be established between network devices 110-0 and 110-1. For example, ports $PORT_0, \ldots,$ and $PORT_3$ of network device 110-0 may be grouped together into a $LAG_{110-0}$ that may communicate bi-directionally with ports $PORT_0, PORT_1, PORT_2,$ and $PORT_3$ of network device 110-1, via links 120-0, 120-1, 120-2, and 120-3. Ports $PORT_0$, $PORT_1, PORT_2,$ and $PORT_3$ of network device 110-1 may be grouped together into a $LAG_{110-1}$. $LAG_{110-0}$ and $LAG_{110-1}$ may permit ports $PORT_0, PORT_1, PORT_2,$ and $PORT_3$ of network device 110-0 and ports $PORT_0, PORT_1, PORT_2,$ and $PORT_3$ of network device 110-1 to communicate bi-directionally. Datagrams may be dynamically distributed between ports (e.g., $PORT_0, PORT_1, PORT_2,$ and $PORT_3$) of network device 110-0 and ports (e.g., $PORT_0, PORT_1, PORT_2,$ and $PORT_3$) of network device 110-1 so that administration of what datagrams actually flow across a given link (e.g., links 120-0, ..., and 120-3) may be automatically handled by $LAG_{110-0}$ and $LAG_{110-1}$.

In another implementation, a LAG may be established between network devices 110-0 and 110-2. For example, ports $PORT_{N-3}, \ldots,$ and $PORT_N$ of network device 110-0 may be grouped together into a $LAG_{110-N}$ that may communicate bi-directionally with ports $PORT_0, PORT_1, PORT_2,$ and $PORT_3$ of network device 110-2, via links 120-N-3, 120-N-2, 120-N-1, and 120-N. Ports $PORT_0, PORT_1, PORT_2,$ and $PORT_3$ of network device 110-2 may be grouped together into a $LAG_{110-2}$. $LAG_{110-N}$ and $LAG_{110-2}$ may permit ports $PORT_{N-3}, \ldots,$ and $PORT_N$ of network device 110-0 and ports $PORT_0, PORT_1, PORT_2,$ and $PORT_3$ of network device 110-2 to communicate bi-directionally. Datagrams may be dynamically distributed between ports (e.g., $PORT_{N-3}, \ldots,$ and $PORT_N$) of network device 110-0 and ports (e.g., $PORT_0$, $PORT_1, PORT_2,$ and $PORT_3$) of network device 110-2 so that administration of what datagrams actually flow across a given link (e.g., links 120-N-3, ..., and 120-N) may be automatically handled by $LAG_{110-N}$ and $LAG_{110-2}$. With such an arrangement, network devices 110 may transmit and receive datagrams simultaneously on all links within a LAG established by network devices 110.

Every port in network devices 110 may be associated with a real MAC address. Datagrams originating from a port may include the real MAC address of the port in a source MAC address field, and datagrams transmitted to a port may include the real MAC address of the port in a destination MAC address field. Under the seven layer OSI reference model, the LAG layer may be a sub-layer of the data link layer and may be located above the MAC sub-layer. The LAG layer may replace the MAC addresses of a port in a LAG with a LAG MAC address. For example, $LAG_{110-0}$ may replace the MAC addresses of ports $PORT_0, \ldots,$ $PORT_3$ with a LAG MAC address. Thus, datagrams exiting a port of a LAG may have the LAG MAC address in a source address field of the Ethernet frame, and datagrams entering a port of a LAG may have the LAG MAC address in a destination address field. In one implementation, the LAG MAC address may be established as set forth in co-pending application Ser. No. 11/550,015, entitled "LINKED AGGREGATION," filed on the same date herewith, the disclosure of which is incorporated by reference herein in its entirety.

Figure 2:
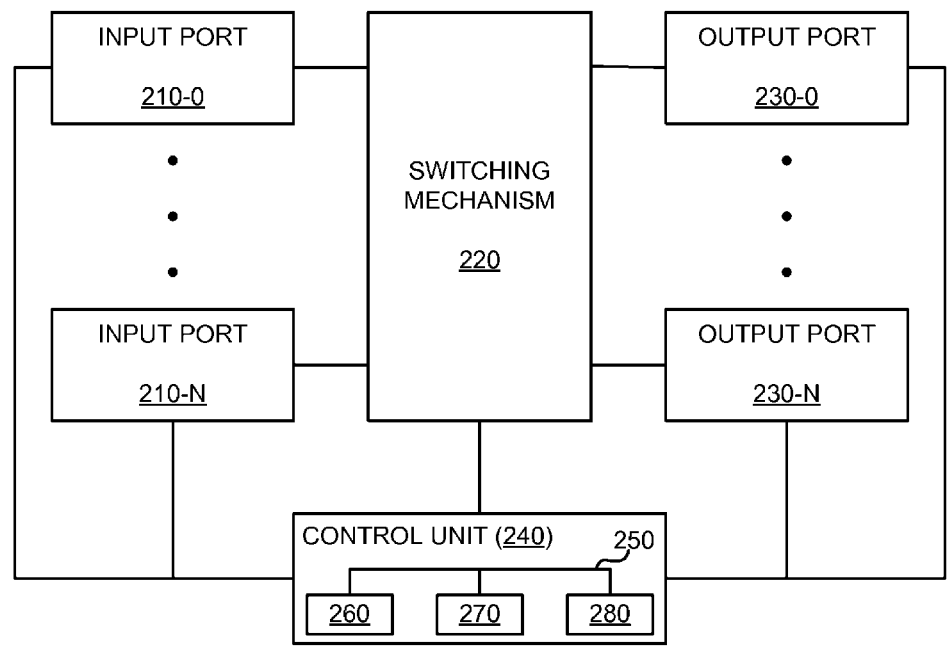
FIG. 2 is a diagram of an exemplary network device of FIG. 1.

FIG. 2 is an exemplary diagram of a device that may correspond to one of network devices 110 of FIG. 1. The device may include input ports 210, a switching mechanism 220, output ports 230, and a control unit 240. Input ports 210 may be the point of attachment for a physical link (e.g., link 120) (not shown) and may be the point of entry for incoming datagrams. Switching mechanism 220 may interconnect input ports 210 with output ports 230. Output ports 230 may store datagrams and may schedule datagrams for service on an output link (e.g., link 120) (not shown). Control unit 240 may use routing protocols and one or more forwarding tables for forwarding datagrams.

Input ports 210 may carry out data link layer encapsulation and decapsulation. Input ports 210 may look up a destination address of an incoming datagram in a forwarding table to determine its destination port (i.e., route lookup). In order to provide quality of service (QoS) guarantees, input ports 210 may classify datagrams into predefined service classes. Input ports 210 may run data link-level protocols or network-level protocols. In other implementations, input ports 210 may send (e.g., may be an exit point) and/or receive (e.g., may be an entry point) datagrams.

Switching mechanism 220 may be implemented using many different techniques. For example, switching mechanism 220 may include busses, crossbars, and/or shared memories. The simplest switching mechanism 220 may be a bus that links input ports 210 and output ports 230. A crossbar may provide multiple simultaneous data paths through switching mechanism 220. In a shared-memory switching mechanism 220, incoming datagrams may be stored in a shared memory and pointers to datagrams may be switched.

Output ports 230 may store datagrams before they are transmitted on an output link (e.g., link 120). Output ports 230 may include scheduling algorithms that support priorities and guarantees. Output ports 230 may support data link layer encapsulation and decapsulation, and/or a variety of higher-level protocols. In other implementations, output ports 230 may send (e.g., may be an exit point) and/or receive (e.g., may be an entry point) datagrams.

Control unit 240 may interconnect with input ports 210, switching mechanism 220, and output ports 230. Control unit 240 may compute a forwarding table, implement routing protocols, and/or run software to configure and manage network device 110. Control unit 240 may handle any datagram whose destination address may not be found in the forwarding table.

In one implementation, control unit 240 may include a bus 250 that may include a path that permits communication among a processor 260, a memory 270, and a communication interface 280. Processor 260 may include a microprocessor or processing logic that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 110 may perform certain operations, as described in detail below. Network device 110 may perform these operations in response to processor 260 executing software instructions contained in a computer-readable medium, such as memory 270. A computer-readable medium may be defined as a physical or logical memory device and/or carrier wave.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Figure 3:
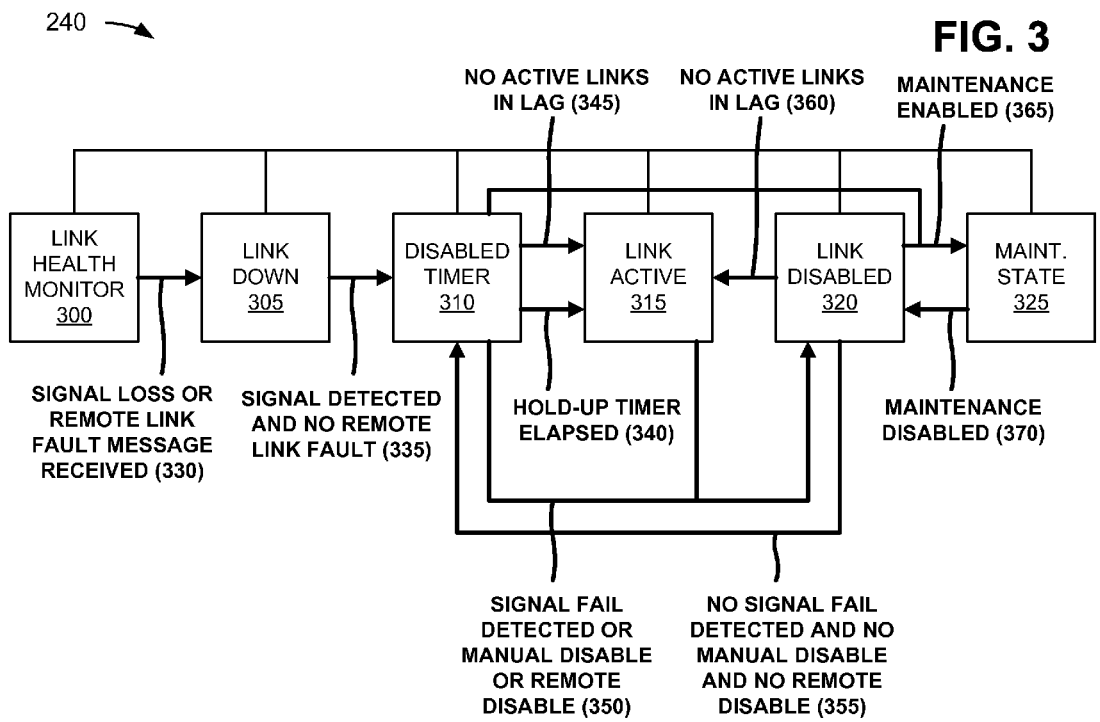
FIG. 3 is a functional block diagram showing operations performed by a control unit of the network device of FIG. 2.

LAGs may be created with two or more links (e.g., input ports 210 or output ports 230) of network device 110 with LAG MAC addressing. FIG. 3 provides a state diagram showing exemplary operations performed by control unit 240 of network device 110. For example, control unit 240 may include a link health monitor 300, a link down portion 305, a disabled timer portion 310, a link active portion 315, a link disabled portion 320, and maintenance state portion 325. Each of the components shown in FIG. 3 may be interrelated with each other. Control unit 240 may alternatively include other components and/or component interrelations not shown in FIG. 3.

Link health monitor 300 may monitor and identify problems with the health of a link in a LAG. For example, if an active or inactive link has health problems, link health monitor 300 may provide information 330 indicating, e.g., loss of a link signal or a remote link fault message to link down portion 305. Link down portion 305 may determine based on information 330 whether a link is down (i.e., not operational). For example, if link down portion 305 detects a signal and does not detect a remote link fault message, link down portion 305 may provide information 335 indicating signal detection and no remote link fault message to disabled timer portion 310.

Disabled timer portion 310 may include a hold-up timer that may prevent a link from becoming active until the hold-up timer has elapsed. If a link is under control of disabled timer portion 310 (i.e., in a disabled timer state), datagrams may be received by the link but may be prevented from being transmitted by the link. If the hold-up timer has elapsed, disabled timer portion 310 may provide information 340 indicating that the hold-up timer has elapsed to link active portion 315, and link active portion 315 may make a link active (i.e., datagrams may be transmitted and/or received by the link) If there are no active links in a LAG, disabled timer portion 310 may provide information 345 indicating that there are no active links in the LAG to link active portion 315, and link active portion 315 may make a link active. Such an arrangement may prevent complete failure of a LAG by enabling datagrams to be transmitted and/or received by the activated link. If a signal fail is detected, a manual disable command is received, or a remote disable message is received, disabled timer portion 310 or link active portion 320 may provide information 350 indicating the aforementioned condition(s) to link disabled portion 320. Disabled timer portion 310 may also provide information 365 enabling link maintenance to maintenance state portion 325, as described below.

As further shown in FIG. 3, link disabled portion 320 may disable a link if it receives, for example, information 350 indicating a signal failure, receipt of a manual disable command, and/or receipt of a remote disable message. If a link is in a disabled state, datagrams may be received by the link but may be prevented from being transmitted by the link. If no signal failure is detected, a manual disable command is no longer in effect, or a remote disable message is no longer received, link disabled portion 320 may provide information 355 indicating the aforementioned condition(s) to disabled timer portion 310, and disabled timer portion 310 may start the hold-up timer. If there are no active links in a LAG, link disabled portion 320 may provide information 360 indicating that there are no active links in the LAG to link active portion 315, and link active portion 315 may make a link active. Link disabled portion 320 may also provide information 365 enabling link maintenance to maintenance state portion 325.

If maintenance state portion 325 receives information 365 enabling link maintenance, maintenance may be performed on the disabled link. During maintenance, system datagrams (e.g., datagrams transmitted and/or received by a link when a link is active) may be prevented from being transmitted and/or received by the disabled link, but test datagrams (e.g., datagrams used to test the functionality of a link) may be transmitted and/or received by the disabled link. Test datagrams may be used to determine the operational state of the disabled link, and/or to pinpoint problems with the disabled link. Maintenance state portion 325 may provide information 370 disabling link maintenance to link disabled portion 320, and link disabled portion 320 may perform the operations described above on the disabled link.

FIGS. 4-7 are exemplary diagrams of some components of control unit 240 of network device 110.

Figure 4:
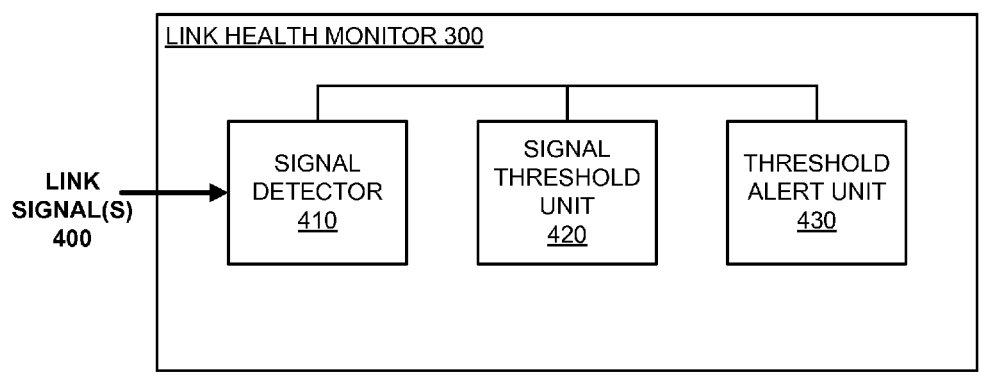
FIG. 4 is an exemplary diagram showing the operations performed by a link health monitor portion of the control unit of FIG. 3.

Link health monitor 300, as shown in FIG. 4, may perform a variety of tasks to aid in monitoring the health of inactive and/or active links in a LAG. For example, in one implementation, link health monitor 300 may receive link signal(s) 400 and may include a signal detector 410, a signal threshold unit 420, and a threshold alert unit 430. Signal detector 410 may detect signal degrade condition(s) and/or signal fail condition(s) for incoming link signal(s) 400 based on errored frames (e.g., link-level datagrams) and/or based on an 8B/10B code violation rate. "8B/10B code" is a line code that maps eight-bit symbols to ten-bit symbols to achieve direct current (DC) balance and bounded disparity. Both errored frames and 8B/10B code violations may be used by signal detector 410 so that network device 110 may respond to link degradation and/or failure. 8B/10B may have the additional benefits of being available regardless of datagram traffic load, not varying with frame size, and/or being monitored when a link is not actively configured for datagram traffic.

Signal threshold unit 420 may provide a configurable signal degrade threshold range based on errored frames (e.g., about 1 to about 1,000 errored frames in about 100,000 to about 1,000,000 received frames). Signal threshold unit 420 may also provide a configurable signal fail threshold range based on errored frames (e.g., about 1 to about 1,000 errored frames in about 1,000 to about 100,000 received frames). A configurable signal degrade threshold range based on the 8B/10B code violation rate (e.g., about $10^{-5}$ to about $10^{-9}$) may be provided by signal threshold unit 420. A configurable signal fail threshold range based on the 8B/10B code violation rate (e.g., about $10^{-3}$ to about $10^{-5}$) may also be provided by signal threshold unit 420. Signal threshold unit 420 may also provide a clearing threshold range (i.e., a threshold range indicating a signal is functioning properly) based on errored frames and/or the 8B/10B code violation rate. For example, in one implementation, a clearing threshold range of one-tenth the threshold range for declaring a signal degrade or signal fail condition may be provided by signal threshold unit 420.

If a detected signal degrade or signal fail condition is outside of one of the threshold ranges provided by signal threshold unit 420, threshold alert unit 430 may generate an alert indicating an appropriate signal threshold violation. Threshold alert unit 430 may send the alert to link down portion 310, and network device 110 may disable the link as described above and below. In one implementation, for example, to signal that a LAG link should be disabled either through manual disabling, signal degrade condition detection, or signal fail detection, network device 110 may send an event notification of the type "Errored Frame Seconds Summary Event TLV" with the "Errored Frame Second Summary" field set to "1's" (e.g., as set forth in Modified IEEE 802.3ah, Clause 57.5.3.4, item f) to a far end of the LAG link (e.g., to another network device 110 connected to the link). This may indicate to the far end of the link that there may be more Errored Frame Seconds than an allowable upper boundary (e.g., 900 seconds as defined by the "Errored Frame Second Summary" field). If an "Errored Frame Seconds Summary Event TLV" with the "Errored Frame Second Summary" field set to "1's" is received, network device 110 may disable the link. Threshold alert unit 430 may also generate an alert when a signal degrade condition or a signal fail condition is cleared.

Although FIG. 4 shows exemplary tasks performed by link health monitor 300, in other implementations, link health monitor 300 may perform additional tasks that may be used to aid in monitoring the health of links in a LAG.

Figure 5:
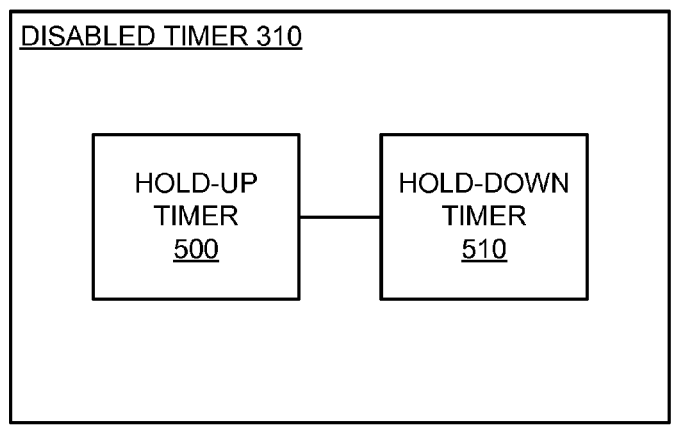
FIG. 5 is an exemplary diagram showing the operations performed by a disabled timer portion of the control unit of FIG. 3.

Disabled timer portion 310, as shown in FIG. 5, may perform a variety of tasks to aid in moving datagrams between links when one or more links are coming in and out of service (e.g., active and disabled states). For example, in one implementation, disabled timer portion 310 may include a hold-up timer 500 and a hold-down timer 510. Hold-up timer 500 may provide a hold-up time that may be the waiting period after a link of a LAG has been declared trouble free and before it may receive datagrams. Hold-up timer 500 may provide a configurable hold-up time range (e.g., of about 5 to 12 minutes, in 1 minute increments). The link may transition to the disabled state (i.e., datagrams may be received by the link but may be prevented from being transmitted by the link) during the hold-up time. This may enable the link to be brought online for monitoring its health and for protection purposes, but may prevent datagrams from being transmitted by the link until the hold-up time has elapsed. The disabled link may be made active for sending and/or receiving datagrams at the end of the hold-up time period. For example, in one implementation described above in connection with FIG. 3, if the hold-up timer (e.g., hold-up timer 500) has elapsed, disabled timer portion 310 may provide information 340 indicating that the hold-up timer has elapsed to link active portion 315, and link active portion 315 may make a link active.

Hold-down timer 510 may provide a hold-down time that may be the waiting period for network device 110 to disallow datagram traffic onto a link of a LAG after the link has entered into a troubled state. Hold-down timer 510 may provide a configurable hold-down time range (e.g., of about 0 to 150 milliseconds, where "0" may indicate a link is disabled).

In one implementation, disabled timer portion 310 may signal a link failure by sending a signal (e.g., information 350) with a "Link Fault" flag set to "1" as specified in Modified IEEE 802.3ah-2004, Clause 57.4.2.1. If network device 110 receives the signal with the "Link Fault" flag set to "1", network device 110 may disable the link once the hold-down time has elapsed.

Although FIG. 5 shows exemplary tasks performed by disabled timer portion 310, in other implementations, disabled timer portion 310 may perform additional tasks that may be used to aid in moving datagrams between links when one or more links are coming in and out of service.

Figure 6:
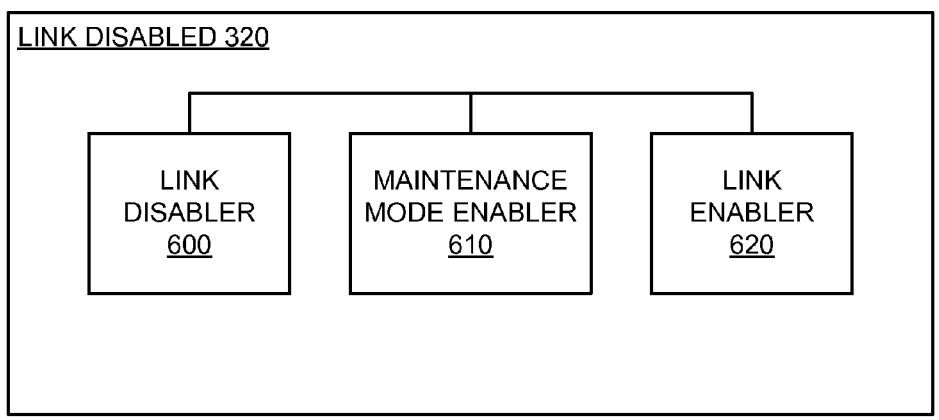
FIG. 6 is an exemplary diagram showing the operations performed by a link disabled portion of the control unit of FIG. 3.

Link disabled portion 320, as shown in FIG. 6, may perform a variety of tasks to aid in removing links from service or from a LAG. For example, in one implementation, link disabled portion 320 may include a link disabler 600, a maintenance mode enabler 610, and a link enabler 620. Link disabler 600 may disable any link within any of the LAGs created by network device 110, either through manual provisioning, signal degrade condition detection, or signal fail condition detection. A disabled link may remain in its LAG but may not transmit datagrams. A disabled link may, however, be capable of receiving and monitoring datagrams. If a link is disabled by link disabler 600, link disabler 600 may transmit a code (e.g., an "Offline" Remote Fault encoding per IEEE 802.3, Clause 37) to the far end of the link being disabled (e.g., to another network device 110 connected to the disabled link). If the disabled link code is received by a far end network device (e.g., network device 110 on the far end of the disabled link), the far end network device may disable the link.

Maintenance mode enabler 610 may permit a disabled link to be put in maintenance mode for trouble shooting purposes. For example, in one implementation described above in connection with FIG. 3, maintenance mode enabler 610 may provide information 365 enabling link maintenance to maintenance state portion 325.

Link enabler 620 may automatically enable a disabled link (e.g., by sending a signal to enable the link to link active portion 315) and may generate appropriate threshold clearing messages (e.g., to signal threshold unit 420 and threshold alert unit 430 of link health monitor 300) to generate an alert when a signal degrade condition or a signal fail condition is cleared. Link enabler 620 may also accept a manual command to enable a disabled link that is not in maintenance mode. If all of the links in a LAG are disabled and to avoid complete LAG failure, link enabler 620 may automatically enable a disabled link(s) within the LAG that is not in maintenance mode. For example, in one implementation described above in connection with FIG. 3, if there are no active links in a LAG, link disabled portion 320 (e.g., link enabler 620) may provide information 360 indicating that there are no active links in the LAG to link active portion 315, and link active portion 315 may make a link active. If a disabled link is enabled by link enabler 620, network device 110 (e.g., link enabler 620) may transmit a signal to the far end of the link being enabled (e.g., to another network device 110 connected to the disabled link). For example, link enabler 620 may signal the far end network device by transmitting an event notification of the type "Errored Frame Seconds Summary Event TLV" with the "Errored Frame Second Summary" field set to "0's" to the far end network device.

In one implementation, link enabler 620 may signal that a link has been made active by sending a signal with a "Link Fault" flag set to "0" as specified in Modified IEEE 802.3ah-2004, Clause 57.4.2.1. If network device 110 receives the signal with the "Link Fault" flag set to "0", network device 110 may put the link in service (e.g., in the disabled timer state) and may initiate hold-up timer 500.

Although FIG. 6 shows exemplary tasks performed by link disabled portion 320, in other implementations, link disabled portion 320 may perform additional tasks that may be used to aid in removing links from service or from a LAG.

Figure 7:
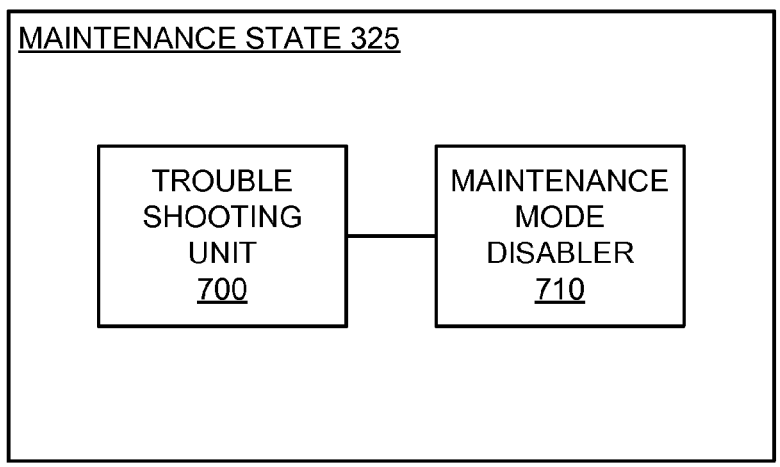
FIG. 7 is an exemplary diagram showing the operations performed by a maintenance state portion of the control unit of FIG. 3.

Maintenance state portion 325, as shown in FIG. 7, may perform a variety of tasks to aid in troubleshooting problem LAG links. For example, in one implementation, maintenance state portion 325 may include a trouble shooting unit 700, and a maintenance mode disabler 710. If maintenance state portion 325 receives information 365 enabling link maintenance, trouble shooting unit 700 may perform maintenance on a disabled link. Network device 110 may prevent links undergoing maintenance from being manually or automatically enabled. During maintenance, trouble shooting unit 700 may prevent system datagrams (e.g., datagrams transmitted and/or received by a link when a link is active) from being transmitted and/or received by the disabled link, but may permit test datagrams (e.g., datagrams used to test the functionality of a link) to be transmitted and/or received by the disabled link. Test datagrams may be used by trouble shooting unit 700 to determine the operational state of a disabled link, and/or to pinpoint problems with the disabled link.

In one implementation described above in connection with FIG. 3, maintenance state portion 325 (e.g., maintenance mode disabler 710) may provide information 370 disabling link maintenance to link disabled portion 320, and link disabled portion 320 may perform the operations described above on the disabled link. For example, maintenance mode disabler 710 may provide a command disabling the maintenance mode (i.e., trouble shooting unit 700 may cease performing maintenance on the disabled link) and may provide a command to link disabled portion 320 to perform operations described above on the disabled link.

Although FIG. 7 shows exemplary tasks performed by maintenance state portion 325, in other implementations, maintenance state portion 325 may perform additional tasks to aid in troubleshooting problem LAG links.

In other implementations, network device 110 may perform additional tasks that may aid in the creation of a disabled timer state, a disabled state, and/or a maintenance state for a LAG link, without removing the link from service or from the LAG. For example, network device 110 may permit certain users (e.g., system administrators) to manually enable or disable a LAG link. Network device 110 may also support LAG provisioning across any physical module (e.g., interface modules, carrier modules, etc.) or slot provided within network device 110. In another example, network device 110 may provide the ability to add or remove any link to a particular LAG without impacting datagram traffic. Network device 110 may further deny manual or automatic disabling of a link of a LAG if the LAG is in service and the link is the last remaining active link of the LAG. Network device 110 may also provide a provisioning command enabling a LAG to be put in or out of service. If links of a particular LAG include either protected or unprotected synchronous optical network (SONET) facilities, network device 110 may upgrade the SONET bandwidth with minimum impact to the performance of the LAG.

In another example, network device 110 may support auto-negotiation per IEEE 802.3, Clauses 28 and 37, on LAG links. The auto-negotiation standard may allow devices based on several Ethernet standards (e.g., from 10 BaseT to 1000 BaseT) to coexist in a network by mitigating the risks of network disruption arising from incompatible technologies. Auto-negotiation may be used by network device 110 as a LAG link disabling mechanism. However, network device 110 may provide a default setting for auto-negotiation that enables (i.e., activates) links of a LAG. Network device 110 may signal a link failure by sending a "Link_Failure" Remote Fault encoding per IEEE 802.3, Clause 37, and may signal that a link has been restored by sending a "No Error, Link OK" Remote Fault encoding per IEEE 802.3, Clause 37. If network device 110 receives a "Link_Failure" Remote Fault encoding, network device 110 may remove the link from service once hold-down timer 510 has elapsed. If network device 110 receives a "No Error, Link OK" Remote Fault encoding, network device 110 may put the link in service in a disabled state and initiate hold-up timer 500.

In still another example, each network device 110 may communicate the states (e.g., active state, disabled state, disabled timer state, maintenance state, etc.) of its LAG links to adjacent network devices 110 connected to the LAG links. Such an arrangement may ensure manageability of signaling between network devices 110 of network 100. Auto-negotiation may support some of such communications by network device 110, but network device 110 may also provide generic mechanisms for communicating LAG link states without interrupting the physical operation of the LAG links with non-compatible systems.

Figure 8B:
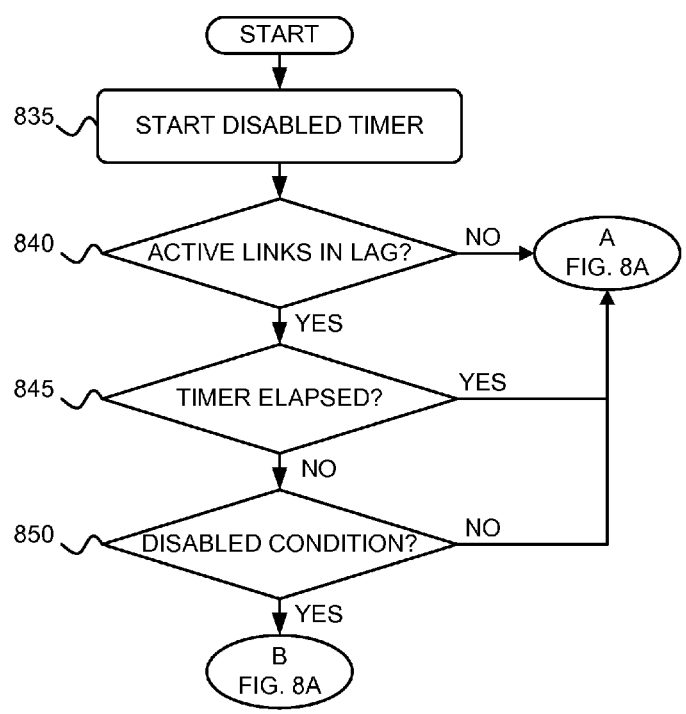
Figure 8C:
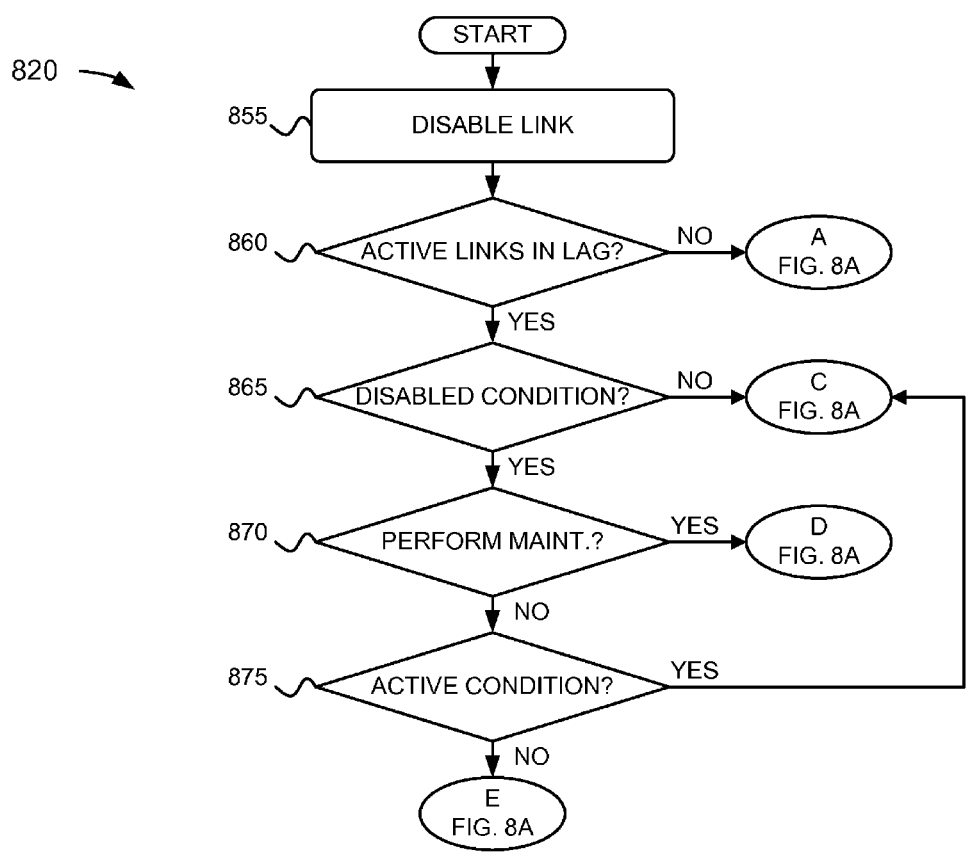

FIGS. 8A-8C show a flowchart of an exemplary process 800 for a network (e.g., network 100) and/or a network device (e.g., network device 110). The process of FIGS. 8A-8C may be performed by a device of a network or may be performed by a device external to the network but communicating with the network. The process may be performed by network device 110 of FIG. 2 (e.g., by control unit 240) and/or one or more devices in network 100.

As shown in FIG. 8A, process 800 may monitor the health of a link (e.g., a port) of a network device (block 805). For example, in one implementation described above in connection with FIG. 3, link health monitor 300 may monitor and identify problems with the health of a link in a LAG. If an active or inactive link has health problems, link health monitor 300 may provide information 330 indicating such problems (e.g., loss of a link signal or a remote link fault message) to link down portion 305. In another implementation described above in connection with FIG. 4, signal detector 410 may detect signal degrade condition(s) and/or signal fail condition(s), signal threshold unit 420 may provide configurable signal degrade or fail threshold ranges based on errored frames and/or 8B/10B code violations, and threshold alert unit 430 may generate an alert indicating an appropriate signal threshold violation.

Process 800 may determine if the link whose health is monitored is down (block 810). For example, in one implementation described above in connection with FIG. 3, link down portion 305 may determine based on information 330 whether a link is down (i.e., not operational). If link down portion 305 detects a signal and does not detect a remote link fault message, link down portion 305 may provide information 335 indicating signal detection and no remote link fault message to disabled timer portion 310.

As further shown in FIG. 8A, process 800 may enable a disabled timer state for the link determined to be down (block 815). For example, in one implementation described above in connection with FIGS. 3 and 5, disabled timer portion 310 may provide a hold-up timer (e.g., hold-up timer 500) that may prevent a link from becoming active until the hold-up timer has elapsed. If a link is under control of disabled timer portion 310, datagrams may be received by the link but may be prevented from being transmitted by the link.

Process 800 may disable the link, i.e., place the link in a disabled state (block 820). For example, in one implementation described above in connection with FIG. 3, if a signal failure is detected, a manual disable command is received, or a remote disable message is received, disabled timer portion 310 or link active portion 315 may provide information 350 indicating the aforementioned condition(s) to link disabled portion 320. Link disabled portion 320 may disable a link if it receives information 350. If a link is in a disabled state, datagrams may be received and monitored by the link, but may be prevented from being transmitted by the link. In another implementation described above in connection with FIG. 6, link disabler 600 of link disabled portion 320 may disable any link within any of the LAGs created by network device 110, either through manual provisioning, signal degrade condition detection, or signal fail condition detection.

As further shown in FIG. 8A, process 800 may perform maintenance on a disabled link (block 825). For example, in one implementation described above in connection with FIG. 3, if maintenance state portion 325 receives information 365 enabling link maintenance, maintenance may be performed on the disabled link. During a maintenance state, system datagrams may be prevented from being transmitted and/or received by the disabled link, but test datagrams may be transmitted and/or received by the disabled link. Test datagrams may be used to determine the operational state of a disabled link, and/or to pinpoint problems with the disabled link.

Process 800 may make a link active, i.e., place the link in an active state (block 830). For example, in one implementation described above in connection with FIG. 3, if the hold-up timer has elapsed, disabled timer portion 310 may provide information 340 indicating that the hold-up timer has elapsed to link active portion 315, and link active portion 315 may make a link active. If there are no active links in a LAG, disabled timer portion 310 or link disabled portion 320 may provide information indicating that there are no active links in the LAG to link active portion 315, and link active portion 315 may make a link active. Such an arrangement may prevent complete failure of a LAG by enabling datagrams to be transmitted and/or received by the activated link.

Process block 815 (FIG. 8A) of process 800 may include the blocks shown in FIG. 8B. Thus, process block 815 may start a disabled timer (block 835). For example, in one implementation described above in connection with FIG. 5, hold-up timer 500 of disabled timer portion 310 may provide a hold-up time that may be the waiting period after a link of a LAG has been declared trouble free and before it may transmit datagrams. Hold-up timer 500 may provide a configurable hold-up time range (e.g., of about 5 to 12 minutes, in 1 minute increments). The link may transition to the disabled state during the hold-up time. This may enable the link to be brought online for monitoring its health and for protection purposes, but may prevent datagrams from being transmitted by the link until the hold-up time has elapsed.

As further shown in FIG. 8B, process block 815 may determine whether there are any active links in the LAG containing the link in the disabled timer state (block 840). If there are no active links in the LAG (block 840-NO), process block 815 may proceed to process block A of FIG. 8A and may make active a link in the disabled timer state. For example, in one implementation described above in connection with FIG. 3, if there are no active links in a LAG, disabled timer portion 310 may provide information 345 indicating that there are no active links in the LAG to link active portion 315, and link active portion 315 may make a link active.

If there are active links in the LAG (block 840-YES), process block 815 may determine if the disabled timer has elapsed (block 845). If the disabled timer has elapsed (block 845-YES), process block 815 may proceed to process block A of FIG. 8A and may make active the link in the disabled timer state. For example, in one implementation described above in connection with FIGS. 3 and 5, if the hold-up timer (e.g., hold-up timer 500) has elapsed, disabled timer portion 310 may provide information 340 indicating that the hold-up timer has elapsed to link active portion 315, and link active portion 315 may make a link active.

If the disabled timer has not elapsed (block 845-NO), process block 815 may determine if the link in the disabled timer state has experienced a disabled condition (block 850). If the link has not experienced a disabled condition (block 850-NO), process block 815 may proceed to process block A of FIG. 8A and may make a link active. For example, if a signal failure or degradation is not detected, a manual disable command is not received, or a remote disable message is not received, disabled timer portion 310 may provide information indicating the aforementioned condition(s) to link active portion 315, and link active portion 315 may make a link active.

If the link has experienced a disabled condition (block 850-YES), process block 815 may proceed to process block B of FIG. 8A and may place the link in a disabled state. For example, in one implementation described above in connection with FIG. 3, if a link experiences a disabled condition (e.g., a signal fail or degradation is detected, a manual disable command is received, or a remote disable message is received), disabled timer portion 310 may provide information 350 indicating the aforementioned condition(s) to link disabled portion 320 and link disabled portion 320 may place the link in a disabled state.

Process block 820 (FIG. 8A) of process 800 may include the blocks shown in FIG. 8C. Thus, process block 820 may disable a LAG link, i.e., place the LAG link in a disabled state (block 855). For example, in one implementation described above in connection with FIG. 6, link disabler 600 of link disabled portion 320 may disable any link within any of the LAGs created by network device 110, either through manual provisioning, signal degrade condition detection, or signal fail condition detection. A disabled link may remain in its LAG but may not transmit datagrams. A disabled link may, however, be capable of receiving and monitoring datagrams.

As further shown in FIG. 8C, process block 820 may determine whether there are any active links in the LAG containing the link in the disabled state (block 860). If there are no active links in the LAG (block 860-NO), process block 820 may proceed to process block A of FIG. 8A and may make a disabled link active. For example, in one implementation described above in connection with FIG. 6, if all of the links in a LAG are disabled and to avoid complete LAG failure, link enabler 620 of link disabled portion 320 may automatically enable a disabled link(s) within the LAG that is not in maintenance mode. In another implementation described above in connection with FIG. 3, if there are no active links in a LAG, link disabled portion 320 (e.g., link enabler 620) may provide information 360 indicating that there are no active links in the LAG to link active portion 315, and link active portion 315 may make a link active.

If there are active links in the LAG (block 860-YES), process block 820 may determine if the link has experienced a disabled condition (block 865). If the link has not experienced a disabled condition (block 865-NO), process block 820 may proceed to process block C of FIG. 8A and may enable the disabled timer state for the link. For example, if a signal failure or degradation is not detected, a manual disable command is not received, or a remote disable message is not received, link disabled portion 320 may provide information 355 indicating the aforementioned condition(s) to disabled timer portion 310, and disabled timer portion 310 may start the hold-up timer and may place the link in a disabled timer state.

As further shown in FIG. 8C, if the link has experienced a disabled condition (block 865-YES), process block 820 may determine whether maintenance is to be performed on the link (block 870). For example, if a link experiences a disabled condition (e.g., a signal failure or degradation is detected, a manual disable command is received, or a remote disable message is received), link disabled portion 320 may provide information 365 enabling link maintenance to maintenance state portion 325.

If maintenance is to be performed on the link (block 870-YES), process block 820 may proceed to process block D of FIG. 8A and may perform maintenance on the disabled link. For example, in one implementation described above in connection with FIG. 7, if maintenance state portion 325 receives information 365 enabling link maintenance, trouble shooting unit 700 may perform maintenance on a disabled link. During maintenance, trouble shooting unit 700 may prevent system datagrams from being transmitted and/or received by the disabled link, but may permit test datagrams to be transmitted and/or received by the disabled link. Test datagrams may be used by trouble shooting unit 700 to determine the operational state of a disabled link, and/or to pinpoint problems with the disabled link.

As further shown in FIG. 8C, if maintenance is not to be performed on the link (block 870-NO), process block 820 may determine if the link has experienced an active condition (block 875). For example, in one implementation described in connection with FIG. 3, maintenance state portion 325 may provide information 370 disabling link maintenance to link disabled portion 320, and link disabled portion 320 may perform the operations described above on the disabled link. In another implementation, link maintenance may be bypassed.

If the link has experienced an active condition (block 875-YES), process block 820 may proceed to process block C of FIG. 8A and may enable the disabled timer state for the link. Otherwise (block 875-NO), process block 820 may proceed to block E of FIG. 8A and may determine if the link is down. For example, in one implementation described above in connection with FIG. 3, if a link experiences an active condition (i.e., no signal failure or degradation is detected, a manual disable command is no longer in effect, or a remote disable message is no longer received), link disabled portion 320 may provide information 355 indicating the aforementioned condition(s) to disabled timer portion 310. Disabled timer portion 310 may start the hold-up timer and may place the link in a disabled timer state.

Systems and methods described herein may provide a disabled state, a disabled timer state, and a maintenance state for links of network devices operating within a LAG, without removing the links from the LAG or from service. The systems and methods may help prevent complete LAG failure, and may monitor the performance of inactive LAG links so that their current health may be available. The systems and methods may also track LAG links that are not currently being used, and may delay use of links that have recently had alarms cleared until the current health of the links can be confirmed. The systems and methods may further integrate a LAG with other forms of Ethernet protection that support a single active link at a time.

The foregoing description of embodiments provides illustration and description, but is not intended to be exhaustive or to limit the invention to the precise form disclosed. Modifications and variations are possible in light of the above teachings or may be acquired from practice of the invention.

For example, while a series of acts have been described with regard to the flowchart of FIGS. 8A-8C, the order of the acts may differ in other implementations consistent with principles of the invention. Further, non-dependent acts may be performed in parallel.

In another example, although FIGS. 3-7 show tasks being performed by control unit 240 of network device 110, in other implementations the tasks shown in FIGS. 3-7 may be performed by other components of network device 110, such as, e.g., switching mechanism 220. Alternatively, some of the tasks shown in FIGS. 3-7 may be performed by another device (outside network device 110).

Aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory memory storage device for storing instructions, the instructions comprising:
one or more instructions which, when executed by a processor, cause the processor to detect a fault condition for a link aggregation group (LAG) link included in a plurality of links of a LAG;
one or more instructions which, when executed by the processor, cause the processor to receive, during a particular period of time, network data for the LAG;
one or more instructions which, when executed by the processor, cause the processor to distribute respective portions of the network data to the plurality of links, a particular portion of the network data being distributed to the LAG link;
one or more instructions which, when executed by the processor, cause the processor to delay, based on detecting the fault condition and until after the particular period of time, transmission, by the LAG link, of the particular portion of the network data, other links, of the plurality of links in the LAG, transmitting other respective portions of the received network data during the particular period of time,
the one or more instructions to delay transmission, by the LAG link, of the particular portion of the network data including:
one or more instructions to enable, after detecting the fault condition, a hold-down timer to disallow traffic onto the LAG link for a hold-down time,
one or more instructions to determine, during the hold-down time, that the fault condition is caused by the LAG link, and
one or more instructions to enable, after the hold-down time and based on determining that the fault condition is caused by the LAG link, a hold-up timer to delay transmission, by the LAG link, of the particular portion of the network data until after the particular period of time; and
one or more instructions which, when executed by the processor, cause the processor to perform maintenance on the LAG link during the particular period of time.

2. The memory storage device of claim 1, where the one or more instructions to delay transmission, by the LAG link, of the particular portion of the network data further include:
one or more instructions to monitor the other links in the LAG; and
one or more instructions to resume, during the particular period of time, transmission of the network data, via the LAG link, when less than a particular quantity of the other links are active.

3. The memory storage device of claim 1, where the fault condition includes one of a plurality of fault conditions, and
where the particular period of time, associated with the one of the plurality of conditions, differs from another particular period of time associated with another of the plurality of fault conditions.

4. The memory storage device of claim 1, the one or more instructions to perform the maintenance on the LAG link including:
one or more instructions to transmit, during the particular period of time, test data via the LAG link, the test data being different from the particular portion of the network data distributed to the LAG link,
one or more instructions to monitor transmission of the test data on the LAG link to produce monitoring results,
one or more instructions to resume, after expiration of the particular period of time, transmission of the network data, via the LAG link, when the monitoring results are within a particular range of values, and
one or more instructions to prevent, after the expiration of the particular period of time and for another period of time, transmission of the network data via the LAG link, when the monitoring results are outside the particular range of values.

5. The memory storage device of claim 4, where the one or more instructions to resume, after the expiration of the particular period of time, transmission of the network data, via the LAG link, further include:
one or more instructions to determine, after the expiration of the particular period of time, whether a disabled condition is present on the LAG link; and
one or more instructions to resume transmission of the particular portion of the network data, via the LAG link, when the disabled condition is not present on the LAG link.

6. A method comprising:
detecting, by a processor, a fault condition for a link aggregation group (LAG) link included in a plurality of links associated with a LAG;
receiving, by the processor and during a particular period of time, network data for the LAG;
distributing, by the processor, respective portions of the network data to the plurality of links, a particular portion of the network data being distributed to the LAG link;
delaying, by the processor and based on detecting the fault condition, transmission of the particular portion of the network data via the LAG link until after the particular period of time, other links, of the plurality of links in the LAG, transmitting other respective portions of the received network data during the particular period of time,
delaying the transmission of the particular portion of the network data including:
enabling, after detecting the fault condition, a hold-down timer to disallow traffic onto the LAG link for a hold-down time,
determining, during the hold-down time, that the fault condition is caused by the LAG link, and
enabling, after the hold-down time and based on determining that the fault condition is caused by the LAG link, a hold-up timer to delay transmission, by the LAG link, of the particular portion of the network data until after the particular period of time; and
performing, by the processor, maintenance on the LAG link during the particular period of time.

7. The method of claim 6, where delaying transmission of the particular portion of the network data includes:
monitoring the other links in the LAG; and
resuming, during the particular period of time, transmission of the particular portion of the network data, via the LAG link, when less than a particular quantity of the other links are active.

8. The method of claim 6, where the fault condition includes one of a plurality of fault conditions, and
where the particular period of time, associated with the one of the plurality of conditions, differs from another particular period of time associated with another of the plurality of fault conditions.

9. The method of claim 6, where performing the maintenance on the LAG link includes:
transmitting, during the particular period of time, test data via the LAG link, the test data being different from the particular portion of the network data distributed to the LAG link;
monitoring transmission of the test data on the LAG link to produce monitoring results;
resuming, after expiration of the particular period of time, transmission of the network data, via the LAG link, when the monitoring results are within a particular range of values; and
preventing, after the expiration of the particular period of time and for another period of time, transmission of the network data via the LAG link, when the monitoring results are outside the particular range of values.

10. The method of claim 9, where resuming transmission, after the expiration of the particular period of time and via the LAG link, of the network data includes:
determining, after the expiration of the particular period of time, whether a disabled condition is present on the LAG link; and
resuming transmission of the network data, via the LAG link, when the disabled condition is not present on the LAG link.

11. A device comprising:
one or more processors to:
detect a fault condition for a link aggregation group (LAG) link included in a plurality of links associated with a LAG,
receive, during a particular period of time, network data for the LAG
distribute respective portions of the network data to the plurality of links, the one or more processors, when distributing the respective portions, being further to distribute a particular portion of the network data to the LAG link, delay, based on detecting the fault condition and until after the particular period of time, transmission, by the LAG link, of the particular portion of the network data, other links, of the plurality of links in the LAG, transmitting other respective portions of the received network data during the particular period of time, and the one or more processors, when delaying the transmission, by the LAG link, of the particular portion of the network data, being further to:

enable, after detecting the fault condition, a hold-down timer to disallow traffic onto the LAG link for a hold-down time, determine, during the hold-down time, that the fault condition is caused by the LAG link, and enable, after the hold-down time and based on determining that the fault condition is caused by the LAG link, a hold-up timer to delay transmission, by the LAG link, of the particular portion of the network data until after the particular period of time, and perform maintenance on the LAG link during the particular period of time.

12. The device of claim 11, where the one or more processors, when delaying transmission, by the LAG link, of the particular portion of the network data, are further to:

monitor the other links in the LAG, and resume, during the particular period of time, transmission of the network data, via the LAG link, when less than a particular quantity of the other links are active.

13. The device of claim 11, where the fault condition includes one of a plurality of fault conditions, and where the particular period of time, associated with the one of the plurality of conditions, differs from another particular period of time associated with another of the plurality of fault conditions.

14. The device of claim 11, where the one or more processors, when performing the maintenance on the LAG link, are further to:

transmit, during the particular period of time, test data via the LAG link, the test data being different from the particular portion of the network data distributed to the LAG link, monitor transmission of the test data on the LAG link to produce monitoring results, resume, after expiration of the particular period of time, transmission of the network data, via the LAG link, when the monitoring results are within a particular range of values, and prevent, after the expiration of the particular period of time and for another period of time, transmission of the network data via the LAG link, when the monitoring results are outside the particular range of values.

15. The device of claim 14, where the one or more processors, when resuming, after the expiration of the particular period of time, transmission of the network data, via the LAG link, are further to:

determine, after the expiration of the particular period of time, whether a disabled condition is present on the LAG link, and resume transmission of the network data, via the LAG link, when the disabled condition is not present on the LAG link.

* * * * *